United States Patent
Talkowski

[11] Patent Number: 5,866,658
[45] Date of Patent: *Feb. 2, 1999

[54] HIGH PERFORMANCE IONOMER BLENDS

[75] Inventor: Charles John Talkowski, Hockessin, Del.

[73] Assignee: E. I. du Pont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 703,294

[22] Filed: Aug. 26, 1996

[51] Int. Cl.$^6$ ..................................................... C08L 77/00
[52] U.S. Cl. ........................................... 525/183; 524/514
[58] Field of Search ............................................. 525/183

[56] References Cited

U.S. PATENT DOCUMENTS

| | | | |
|---|---|---|---|
| 3,845,163 | 10/1974 | Murch | 260/857 |
| 4,105,709 | 8/1978 | Iwami et al. | 260/857 L |
| 4,174,358 | 11/1979 | Epstein | 525/183 |
| 4,187,358 | 2/1980 | Kyo et al. | 525/132 |
| 4,217,430 | 8/1980 | Starkweather, Jr. et al. | 525/183 |
| 4,299,744 | 11/1981 | Stewart | 260/23 AR |
| 4,310,638 | 1/1982 | Coran et al. | 525/183 |
| 4,335,223 | 6/1982 | Flood et al. | 525/179 |
| 4,404,325 | 9/1983 | Mason et al. | 525/179 |
| 4,412,040 | 10/1983 | Albee, Jr. et al. | 525/143 |
| 4,436,872 | 3/1984 | Flood et al. | 525/179 |
| 4,603,172 | 7/1986 | Albee et al. | 525/143 |
| 4,766,174 | 8/1988 | Statz | 525/64 |
| 4,801,649 | 1/1989 | Statz | 525/183 |
| 4,851,473 | 7/1989 | Dunphy | 525/66 |
| 4,885,340 | 12/1989 | Hamada et al. | 525/183 |
| 4,970,045 | 11/1990 | Steinberg et al. | 264/310 |
| 5,112,908 | 5/1992 | Epstein | 525/66 |
| 5,179,168 | 1/1993 | Hirasawa | 525/221 |

FOREIGN PATENT DOCUMENTS

| | | | |
|---|---|---|---|
| 674595 | 11/1963 | Canada | 400/77 |
| 713631 | 7/1965 | Canada | 400/77 |
| 0 276 828 A | 8/1988 | European Pat. Off. | C08L 77/00 |
| 0 574 532 B1 | 4/1992 | European Pat. Off. | C08L 77/00 |
| 52-052957-A | 4/1977 | Japan | C08L 3/04 |
| 53101-048 | 9/1978 | Japan | B29D 23/03 |
| 52-3127-547 | 11/1978 | Japan | C08L 23/08 |
| 56-055442 | 5/1981 | Japan | C08L 23/26 |
| 57-133130-A | 8/1982 | Japan | C08J 7/10 |
| 57-160612-A | 10/1982 | Japan | B29D 7/02 |
| 58-074748-A | 5/1983 | Japan | C08L 77/00 |
| 03 064343 A | 3/1991 | Japan | C08L 23/26 |
| 963380 | 5/1962 | United Kingdom . | |
| 2 164 342 | 3/1986 | United Kingdom | C08L 23/08 |

*Primary Examiner*—Patricia A. Short
*Attorney, Agent, or Firm*—Craig H. Evans

[57] ABSTRACT

Blends of highly-neutralized ionomers of copolymers of ethylene and high weight percentages of α,β-ethylenically-unsaturated $C_3$–$C_8$ carboxylic acids dispersed in a continuous or co-continuous polyamide phase are provided and a process for making such blends. The blends are particularly useful in applications such as molded parts where toughness, high gloss, abrasion/scratch (mar) resistance, UV resistance, high temperature properties and stiffness are desired.

26 Claims, 2 Drawing Sheets

HIGH PERFORMANCE IONOMER BLENDS

FIELD OF THE INVENTION

This invention relates to ionomer/polyamide blends, particularly blends of highly neutralized copolymers of ethylene and high weight percentages of α,β-ethylenically-unsaturated $C_3$–$C_8$ carboxylic acids dispersed in semicrystalline polyamides such as nylon-6. These blends are particularly useful in applications such as molded parts where a combination of toughness, high gloss, abrasion/scratch (mar) resistance, UV resistance, high temperature properties and stiffness are desired.

BACKGROUND OF THE INVENTION

There is an overall need in molded parts, particularly in automotive applications such as bumpers, fender extensions, hub caps, and other fascia components and molded exterior parts, for products that have high gloss, good weatherability, high impact strength and high temperature properties (e.g., tensile strength and dimensional stability such as sag and creep resistance). It is also desirable to be able to mold in solid and metallic colors and, optionally, to be able to paint the parts. "Solid" colors present a homogenous finish, even at very close inspection. All ingredients, which can be substantial in number, are milled and blended such that, when applied, they appear to have been produced from a single, homogenous ingredient. The solid color does not sparkle or brighten when directly illuminated by a light source, nor does it appear to change significantly when viewed from different angles. "Metallic" colors (including pearlescents) contain discrete flake pigments, which can range from pearl flakes to aluminum flakes or mica flakes. These flakes are large enough to be discretely identifiable within the field of color being observed. The metallic color has a noticeable "sparkle" when the surface is directly illuminated with a light source, plus they appear to change in color as the panel is rotated from a perpendicular angle to an oblique one. This property is called "polychromaticity". This change in color as the viewing angle is rotated is also referred to as "travel" or "flop".

BEXLOY®W automotive engineering resin, a blend of ionomer and polyethylene reinforced by glass fiber, marketed by E. I. du Pont de Nemours and Company, has found increasing use in molded parts such as automobile bumpers because it satisfies most of these needs. Its benefits include good gloss (appearance), moderate mar resistance, good processibility and high impact strength at relatively low cost. Solid color can be incorporated into the material, but success in incorporating metallic colors has been limited. Also, paint adherence to BEXLOY®W resin is poor and paint application that requires use of high temperature paint baking ovens (Original Equipment Manufacturing "OEM" Painting) is not feasible since BEXLOY®W lacks suitable high temperature properties.

For applications such as automobile fascia (bumpers, for example), a mar resistance greater than that inherent in BEXLOY®W resin is needed. Thus, when using BEXLOY®W resin, a light grain is typically applied to the surface to enhance mar resistance. Any graining, however light and glossy, substantially retards the "Distinctness of Image" (DOI), a key index used to evaluate the perceived quality of an exterior finish in the automotive industry. DOI, a measure of the "crispness" or "degree of definition" of a reflection of a object in a colored finish compared to the actual object itself, is measured from the angle of reflection of a light beam from a spherical surface. DOI can be measured by a Hunterlab Model No. D47R-6F Doigon Gloss Meter. The test panel is placed on the instrument sensor and the sharpness of the reflected image is measured. Details of the DOI test procedure are described in GM Test Specification TM-204-M. In the automotive industry, satisfactory finishes on a smooth or "Class A" surface typically will have a finish with a DOI value of at least 60, preferably 80 or higher. A commercial, lightly-grained BEXLOY®W resin fascia used on a Neon automobile has a DOI of 0.

While still retaining other important performance characteristics, there is a need for higher gloss (at least a value of 60 when measured at 20°, and at least 75 when measured at 60°) and higher DOI (at least 60), faster processing, better high temperature properties, and improved mar resistance without the need of light graining. Also, there is a need for being able to incorporate metallic colors and, alternatively, to be able to paint the molded part.

Certain blends of ionomers with polymers other than polyethylene (polyamides, for example) are known in the art. These prior art blends with nylon would not be suitable for the solving the problems experienced with BEXLOY®W resin, however.

U.S. Pat. No. 4,335,223 to Flood, et al., for example, teaches enhancing the notched Izod impact resistance of molded objects made from 50 to 99 wt. % nylon 6 or nylon 66 blended with an α-olefin/α,β-ethylenically-unsaturated $C_3$–$C_8$ carboxylic acid ("ethylene-acid copolymers") by adding 0.05 to 1 wt. % selected metal compounds such as antimony oxide and magnesium oxide.

U.S. Pat. No. 3,845,163 to Murch, another example, teaches improving weld-line toughness of blends of polyamide with ethylene-acid copolymers by neutralizing at least 10 percent of the acid groups with metal ions such as sodium, calcium and zinc in solid or aqueous solution form. Polyamide hydrolysis would be expected to result with the use of aqueous solution. Melt blending in conventional equipment and solution blending or dry mixing followed by extrusion or injection molding are taught. No preference for high intensity mixing is suggested. U.S. Pat. No. 3,845,163 teaches blends containing at least 50 weight percent (wt. %) polyamide (60–85 wt. % is claimed and 80 wt. % exemplified). While a wide range of acid level and degree of neutralization are disclosed, the highest acid level used in the reference is 12 wt. % and the highest neutralization is 76%.

Blends of polyamide and ionomer wherein the ionomer is the major component but the polyamide is the continuous or co-continuous phase have been made by employing compatibilizing agents. U.S. Pat. No. 5,091,478 to Saltman, for example, teaches blends of 25–50 volume % polyamide with ionomer employing polymeric grafting agents containing certain reactive groups. Preferred grafting agents are copolymers derived from ethylene/n-butyl acrylate/glycidyl methacrylate and ethylene/glycidyl methacrylate.

SUMMARY OF THE INVENTION

The desired improvements have been made by the present invention. Important performance characteristics of BEXLOY®W resin have been retained and higher gloss, faster processing, better high temperature properties, and improved mar resistance without the need of light graining have been attained. The need for glass fiber reinforcement has been eliminated. Molded parts made using the blends of this invention have high gloss exhibiting DOI's at least comparable to the best of paint finishes on smooth or "Class A" surfaces, particularly DOI's over 80 and as high as 90 to 95. Solid and metallic colors can be incorporated and parts can be painted. High temperature properties are sufficient to permit OEM Painting without the need for special jigs or hangers to maintain part shape during the bake step. The molded parts with the addition of standard UV stabilizers for both ionomer and polyamide exhibit surprising weatherability, particularly stability when exposed to ultraviolet light for extended periods of time. Improved automobile fascia having DOI of at least 80 and superior mar resistance can be made from the blend of this invention.

This invention relates to ionomer/polyamide (preferably 60 to 40 weight percent (wt. %) ionomer/40 to 60 wt. % polyamide based on total weight of ionomer and polyamide) blends wherein the polyamide forms a continuous (or co-continuous) phase. The ionomer, preferably present in a higher volume percent than the polyamide, is dispersed in the continuous or co-continuous polyamide phase. Preferably, the ionomer forms small particles that preferably are oblong and curvilinear or ellipsoid in shape in a co-continuous polyamide phase or are essentially spherical in a continuous polyamide phase. The average diameter of the essentially spherical particles (cross-sectional diameter or minor axis length of the oblong/ellipsoid particles) preferably is about 0.1 to about 0.2 micrometers ($\mu$m).

The ionomers suitable for this invention are formed from copolymers of ethylene and high weight percentages of $\alpha,\beta$-ethylenically-unsaturated $C_3$–$C_8$ carboxylic acids, preferably methacrylic or acrylic acid. The percentage of acid that is considered as being "high" depends on the acid employed. In the case of methacrylic acid, it preferably is 15 to 25 wt. % based on total weight of the copolymer. The lower preference for acrylic acid is 14 wt. % as a result of molecular weight differences. In the final blend, the acid moieties in the copolymer are highly neutralized (preferably 65 to 100 percent) with metal cations, particularly cations compatible with polyamide, preferably zinc.

The polyamides suitable for this invention are preferably one or more semicrystalline polyamides such as polyepsiloncaprolactam (nylon-6) and polyhexamethylene adipamide (nylon-66). Amorphous polyamides can be substituted for some of the semicrystalline polyamide.

It has been found that ionomer/polyamide blends, wherein the ionomer is the major volume component but is dispersed in a continuous or co-continuous phase of polyamide can be made without employing compatibilizing agents. To make the blends of this invention, ethylene-acid copolymer that, more preferably, is partially neutralized (preferably to about 35 to about 40 mole percent) is melt blended with polyamide under sufficiently intense mixing conditions while concurrently neutralizing (or further neutralizing if ionomer is the starting material) to a high level of neutralization to achieve desired morphology. This "in-situ" neutralization has been found to be effective in obtaining the high neutralization while maintaining conditions during melt blending wherein the polyamide, although present at a lower volume percent than the ionomer, forms a continuous or co-continuous phase without the need for a compatibilizer and the ionomer is uniformly dispersed therein at high percentages of ionomer.

The combination of acid level and high neutralization, together with intensive mixing of the components, provides the desired viscosity relationship of ionomer to polyamide and stabilization of the ionomer dispersed phase in the nylon matrix. This is particularly so when a cation such as zinc, which is compatible with the nylon, is used to neutralize the ethylene-acid copolymer.

As used herein, the term "consisting essentially of" or "consists essentially of" means that the ingredients are essential, however, other ingredients which do not prevent the advantages of the present invention from being realized can also be included.

FIGURES

FIGS. 1(a) and 1(b) are high magnification photographs (obtained though Transmission Electron Microscopy) of a plaque having essentially spherical ionomer particles dispersed in a polyamide continuous phase. FIG. 1(a) is in the parallel direction to flow into the mold and FIG. 1(b) is in the perpendicular direction.

FIGS. 2(a) and 2(b) are high magnification photographs (obtained though Transmission Electron Microscopy) of plaque having oblong and curvilinear ionomer particles dispersed in a polyamide co-continuous phase. FIG. 2(a) is in the parallel direction to flow into the mold and FIG. 2(b) is in the perpendicular direction.

DETAILED DESCRIPTION OF THE INVENTION

Figure 1A:
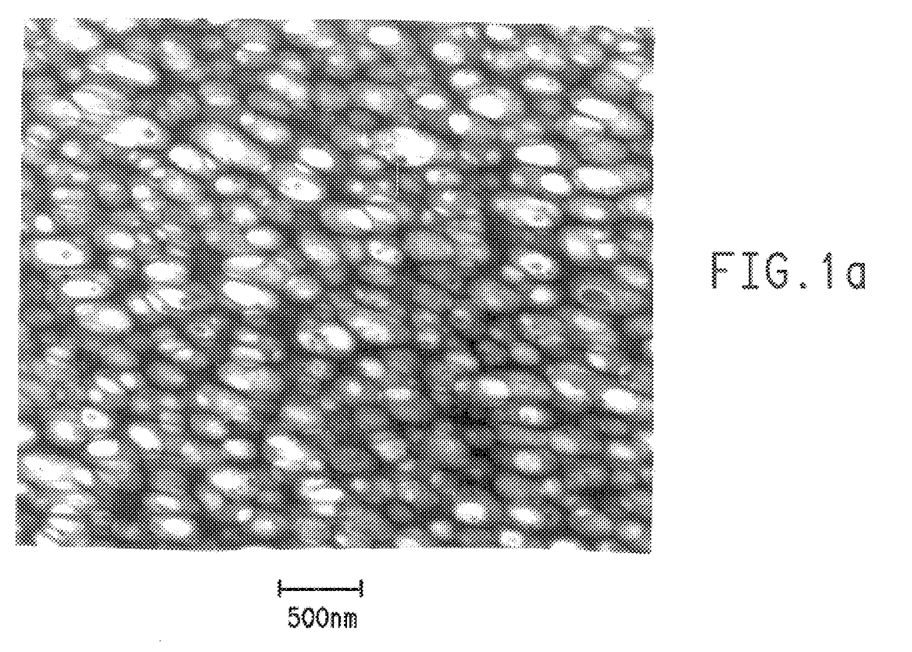
Figure 1B:
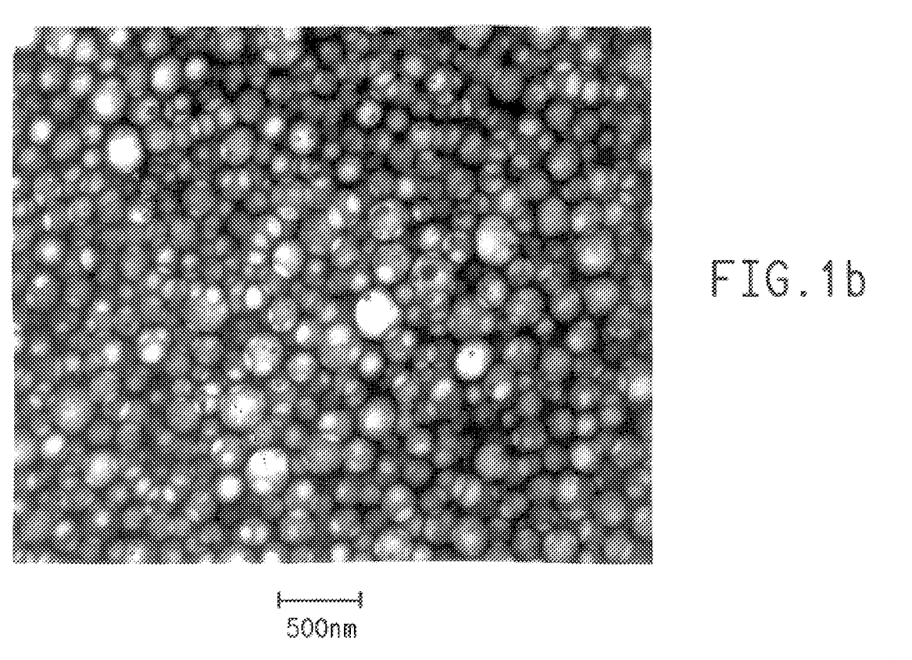
Figure 2A:
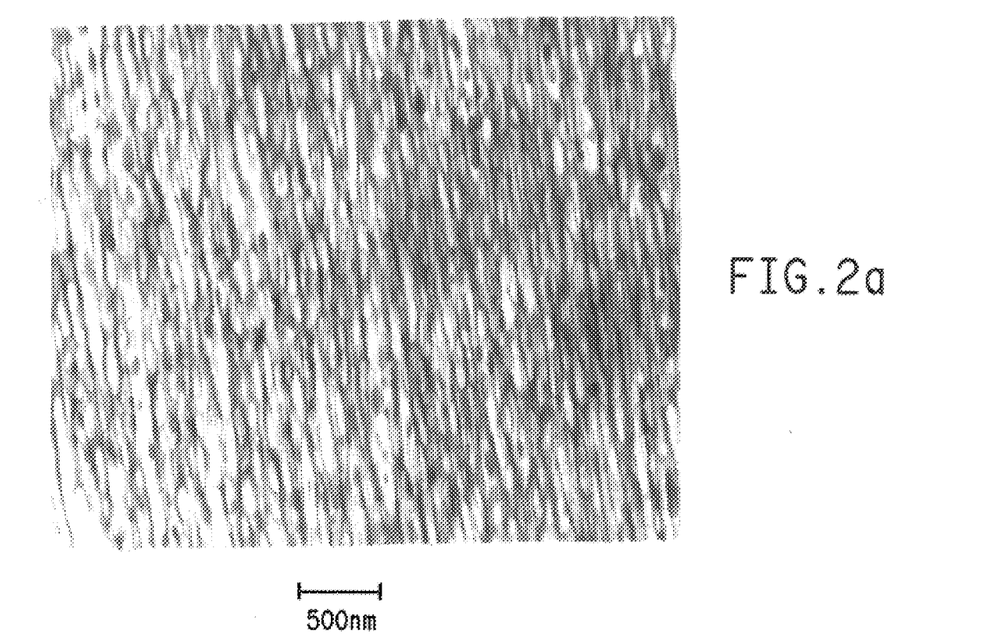
Figure 2B:
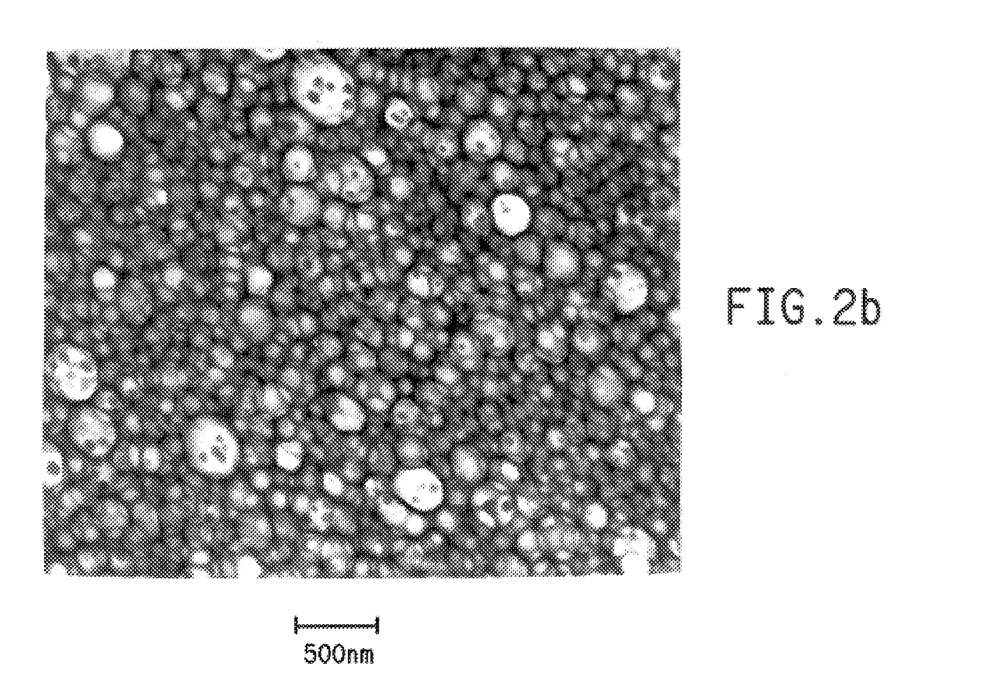

The present invention is a blend of ionomer dispersed in a continuous (or co-continuous) polyamide phase. Preferably, the blend is 60 to 40 (more preferably 50 to 45, also 60 to 55) wt. % ionomer and 40 to 60 (more preferably 50 to 55, also 40 to 45) wt. % polyamide (percentages being based on total ionomer and polyamide). Preferably, the ionomer is dispersed in a reasonably uniform manner as small, essentially spherical particles for the most part with average diameter of preferably about 0.1 to about 0.2 $\mu$m in a continuous polyamide phase as can be seen in FIGS. 1(a) and 1(b). Also, the ionomer preferably is dispersed as oblong and curvilinear or ellipsoid shaped particles for the most part with an average cross-sectional diameter (minor axis length) of about 0.1 to about 0.2 $\mu$m in a co-continuous polyamide phase as can be seen in FIGS. 2(a) and 2(b). The average ratio of major axis length to minor acid length can be about 2 to about 10 or greater.

The blend may also contain components such as ultraviolet (UV) light stabilizers, antioxidants and thermal stabilizers, pigments and dyes, fillers, anti-slip agents, plasticizers, nucleating agents, and the like for both polyamide and ionomer. Preferably, these components are present in amounts of about 1 to about 3 (preferably about 1.5 to about 3) parts per hundred parts by weight of the ionomer/polyamide blend, but may be present in lower or higher levels.

The components of the present invention and the method for preparing the blends are as follows:

Ionomer

The ionomers of the present invention are derived from direct copolymers of ethylene and $\alpha,\beta$-ethylenically-unsaturated $C_3$–$C_8$ carboxylic acid ("ethylene-acid copolymers") by neutralization with metal ions. By "direct copolymer", it is meant that the copolymer is made by polymerization of monomers together at the same time, as distinct from a "graft copolymer" where a monomer is attached or polymerized onto an existing polymer chain. Methods of preparing such ionomers are well known and are described in U.S. Pat. No. 3,264,272 which is herein incorporated by reference. Preparation of the direct ethylene-acid copolymers on which the ionomers are based is described in U.S. Pat. No. 4,351,931 which is also incorporated by reference herein. Ethylene-acid copolymers with high levels of acid are difficult to prepare in continuous polymerizers because of monomer-polymer phase separation. This difficulty can be avoided however by use of "cosolvent technology" as described in U.S. Pat. No. 5,028,674 which is also incorporated herein by reference or by employing somewhat higher pressures than those at which copolymers with lower acid can be prepared.

The ethylene-acid copolymers used to make the ionomeric copolymer of this invention can be E/X/Y copolymers where E is ethylene; X is a softening comonomer and Y is the $\alpha,\beta$-ethylenically-unsaturated $C_3$–$C_8$ carboxylic acid, particularly acrylic or methacrylic acid. Preferably, however, the ethylene-acid copolymer is a dipolymer (no softening comonomer). The preferred acid moieties are methacrylic acid and acrylic acid.

By "softening", it is meant that the polymer is made less crystalline. Suitable "softening" comonomers (X) are monomers selected from alkyl acrylate, and alkyl methacrylate, wherein the alkyl groups have from 1–12 carbon atoms which, when present, may be up to 30 (preferably up to 25, most preferably up to 15) wt. % of the ethylene-acid copolymer.

Preferred ethylene-acid dipolymers are ethylene/acrylic acid and ethylene/methacrylic acid. Specific other copolymers include ethylene/n-butyl acrylate/acrylic acid, ethylene/n-butyl acrylate/methacrylic acid, ethylene/iso-butyl acrylate/methacrylic acid, ethylene/iso-butyl acrylate/acrylic acid, ethylene/n-butyl methacrylate/methacrylic acid, ethylene/methyl methacrylate/acrylic acid, ethylene/methyl acrylate/acrylic acid, ethylene/methyl acrylate/methacrylic acid, ethylene/methyl methacrylate/methacrylic acid, and ethylene/n-butyl methacrylate/acrylic acid.

The ethylene-acid copolymers used to make the ionomeric copolymers of this invention have the acid moiety present in a high amount. The amount that will be considered as "high" will depend on which acid moiety is employed, particularly the molecular weight of the acid moiety. In the case of ethylene/methacrylic acid, the preferred acid level is 15 to 25, (preferably 18 to 25, more preferably 19 to 22) wt. % of the copolymer. In the case of ethylene/acrylic acid, the preferred acid level is 14 to 25, (preferably 16 to 25, more preferably 18 to 22) wt. % of the copolymer. Particularly in view of the disclosures herein, one skilled in the art will be able to determine the "high" acid levels for other acid moieties that are needed to get the desired gloss levels and abrasion resistance.

It will be recognized that it is possible to blend more than one copolymer, the acid level of any one or more being outside the "high" range of the invention, to obtain an average acid level prior to neutralization that is within the preferred high percentage acid levels. Preferably, in the case of blends, the weight percent acid in each acid copolymer from which the ionomer components are derived should be close to the preferred range, and most preferably they should be within this range.

The acid moiety is preferably highly neutralized metal cations, particularly monovalent and/or bivalent metal cations. It is preferable to neutralize with metal cations that are compatible with the nylon, that is, with cations that also interact with the amide links of the polyamide. Preferred metal cations include lithium, magnesium, calcium, and zinc, or a combination of such cations. Zinc is most preferred. Potassium and sodium are poor choices. Potassium-neutralized ethylene/acid copolymers tend to absorb water adversely effecting the nylon. Sodium ionomers are difficult to stabilize to UV radiation. Magnesium and calcium preferably are used in combination with zinc.

While the neutralizing agent (e.g., zinc oxide, magnesium oxide, and calcium oxide) can be added in solid form, it preferably is added as a concentrate in an ethylene-acid copolymer carrier. This concentrate is made by carefully selecting the ethylene-acid copolymer and the blending conditions to assure that the neutralizing agent does not significantly neutralize the carrier. This neutralizing concentrate can also contain small amounts (up to about 2 wt. %) of one or more salts of the metal cations (e.g. acetates and stearates).

To achieve the desired morphology (ionomer dispersed in continuous or co-continuous nylon phase), the ionomer is neutralized to a high enough level to attain a viscosity greater than that of the nylon. It is preferred to first blend a partially neutralized, lower viscosity ethylene-acid copolymer into the nylon and then to further neutralize to raise the ionomer viscosity while melt blending under intense mixing conditions.

As will appreciated by one skilled in the art based on the teachings herein, the preferred level of neutralization will depend on the ethylene-acid copolymers employed and the properties desired. Neutralization in the blend should be sufficient to raise the melt index (MI) of the ionomer in the blend, measured as grams of ionomer exiting a 0.0823 inch orifice in ten minutes (gm/10 min) at 190° C. with 2160 gram weight applied force (ASTM D-1238 condition E), to such a level that, if the ionomer alone (not in the nylon blend) were neutralized to that level, there would be very low to essentially no flow (preferably less than about 0.2 grams/10 minutes). For example, for an ethylene-acid dipolymer of ethylene/19 wt. % methacrylic acid, the following MI values result when the dipolymer is neutralized to the degree indicated:

| % Neutralization | MI(gm/10 min) |
| --- | --- |
| 0 | 60 |
| ~38 | 2.7 |
| ~52–58 | 0.71 |
| ~60 | 0.17 |
| ~67 | 0.13 |
| ~90 | 0 to 0.015 |

In this case the percent neutralization should be about 60% or greater since the grams of ionomer exiting the orifice is less than 0.2 grams per 10 minutes. One skilled in the art can easily determine the preferred percent neutralization for other ionomers. Preferably in the final melt blend with polyamide, the mole percent of acid neutralized is 65 to 100%, more preferably 75 to 100%, alternatively 75 to 85%.

The level of acid and the degree of neutralization can be adjusted to achieve the particular properties desired. Gloss is enhanced by raising the average acid level. High neutralization yields harder, glossier products while more moderate neutralization yields tougher products.

Nylon

Semicrystalline polyamides can be used in the present invention. The term "semicrystalline polyamide" is well known to those skilled in the art. Semicrystalline polyamides suitable for this invention are generally prepared from lactams or amino acids or from condensation of diamines such as hexamethylene diamine with dibasic acids such as sebacic acid. Copolymers and terpolymers of these polyamides are also included. Preferred semicrystalline polyamides are polyepsiloncaprolactam (nylon-6), polyhexamethylene adipamide (nylon-66), most preferably nylon-6. Other semicrystalline polyamides useful in the present invention include nylon-11, nylon-12, nylon-12,12 and copolymers and terpolymers such as nylon-6/66, nylon-6/610, nylon-6/12, nylon-66/12, nylon-6/66/610 and nylon-6/6T.

Amorphous polyamides can be substituted for some of the semicrystalline polyamide to raise the glass transition temperature (Tg) of the nylon phase. Up to about 10 wt. %, preferably up to about 5 wt. %, of the polyamide phase can be amorphous polyamides. The term "amorphous polyamide" is well known to those skilled in the art. "Amorphous polyamide," as used herein, refers to those polyamides which are lacking in crystallinity as shown by the lack of an endotherm crystalline melting peak in a Differential Scanning Calorimeter ("DSC") measurement (ASTM D-3417), 10° C./minute heating rate.

Examples of the amorphous polyamides that can be used include hexamethylenediamine isophthalamide, hexamethylenediamine isophthalamide/terephthalamide terpolymer, having iso/-terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediame with iso-or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processible amorphous polymer. Amorphous polyamides may contain, as comonomers, minor amounts of lactam species such as caprolactam or lauryl lactam, even though polymers based on these monomers alone are not amorphous as long as they do not impart crystallinity to the polyamide. In addition, up to about 10 wt. % of a liquid or solid plasticizer such as glycerol, sorbitol, mannitol, or aromatic sulfonamide compounds (such as "Santicizer 8" from Monsanto) may be included with the amorphous polyamide.

The amorphous polyamide may be a blend of ethylene vinyl alcohol and amorphous nylon in which the polyamide component comprises about 5 to about 95 wt. % of the total composition of EVOH plus polyamide, preferably about 15 to about 70 wt. %, and most preferably about 15 to about 30 wt. %.

The polyamide component should have a viscosity under melt-blend conditions that is high enough to provide the mechanical properties but low enough to create the phase relationship of this invention. The viscosity of the polyamide should be higher than that of the ethylene-acid copolymer or ionomer at low neutralization levels, but should be less than the ionomer at high neutralization levels.

Other Components

Additives normally compounded into plastics may be included in the blend, for example, UV stabilizers, antioxidants and thermal stabilizers, processing aids, pigments and the like. When included, these components are preferably present in amounts of about 1 to about 3 (preferably about 1.5 to about 3) parts per hundred parts by weight of the ionomer/polyamide blend but may be present in lower or higher amounts.

Of particular importance if the part is to be exposed to ultraviolet (UV) light is the inclusion of one or more UV stabilizers for the nylon and for the ionomer. Typically useful UV stabilizers include: benzophenones such as hydroxy dodecyloxy benzophenone, 2,4-dihydroxybenzophenone, hydroxybenzophenones containing sulfonic groups and the like; triazoles such as 2-phenyl-4-(2',2'-dihydroxylbenzoyl)-triazoles; substituted benzothiazoles such as hydroxyphenylthiazoles and the like; triazines such as 3,5-dialkyl-4-hydroxyphenyl derivatives of triazine, sulfur containing derivatives of dialkyl-4-hydroxy phenyl triazines, hydroxy phenyl-1,3,5-triazine and the like; benzoates such as dibenzoate of diphenylol propane, tertiary butyl benzoate of diphenylol propane and the like; and others such as lower alkyl thiomethylene containing phenols, substituted benzenes such as 1,3-bis-(2'-hydroxybenzoyl)benzene, metal derivatives of 3,5-di-t-butyl-4-hydroxy phenyl proprionic acid, asymmetrical oxalic acid, diarylarides, alkylhydroxy-phenyl-thioalkanoic acid ester, and hindered amines of bipiperidyl derivatives.

Preferred UV stabilizers, all available from Ciba Geigy, are TINUVIN®234 (2-(2H-benzotriazol-2-yl)-4,6-bis(1-methyl-1-phenylethyl)phenol), TINUVIN®327 (2-(3',5'-di-tert-butyl-2'-hydroxyphenyl)-5 chlorobenzotriazole), TINUVIN®328 (2-(2'hydroxy-3',5'-di-tert-amylphenyl) benzotriazole), TINUVIN®329 (2-(2'-hydroxy-5'-tert-octylphenyl)benzotriazole), TINUVIN®765 (bis(1,2,2,6,6-pentamethyl-4-piperidinyl) sebacate), TINUVIN®770 (bis (2,2,6,6-tetramethyl-4-piperidinyl) decanedioate), and CHIMASSORB™944 (N,N-bis(2,2,6,6-tetramethyl-4-piperidinyl)-1,6-hexanediamine polymer with 2,4,6-trichloro-1,3,5-triazine and 2,4,4-trimethyl-1,2-pentanamine).

Preferred thermal stabilizers, all available from Ciba Geigy, are IRGANOX®259 (hexamethylene bis(3,5-di-tert-butyl-4-hydroxyhydrocinnamate), IRGANOX®1010 (3,5-bis(1,1-dimethylethyl)-4-hyroxybenzenepropanoic acid, 2,2-bis[[3-[3,5-bis(1,1-dimethylethyl)-4-hydroxyphenyl]-1-oxopropoxy]methyl]1,3-propanediyl ester), IRGANOX®1076 (octadecyl 3,5-di-tert-butyl-4-hydroxyhydrocinnamate), Iragnox®1098 (N,N-hexamethylene bis (3,5-di-tert-butyl- 4-hydroxyhydrocinnamamide), IRGANOX®B215 (33/67 blend of IRGANOX®1010 with tris(2,4-di-tert-butylphenyl)phosphite), IRGANOX®B225 (50/50 blend of IRGANOX®1010 with tris(2,4-di-tert-butylphenyl)phosphite), and IRGANOX®B1171 (50/50 blend of IRGANOX®1098 with tris(2,4-di-tert-butylphenyl)phosphite).

Preferred processing aids include aluminum distearate and zinc stearate, particularly zinc stearate.

Pigments include both clear pigments such as inorganic siliceous pigments (silica pigments for example) and conventional pigments used in coating compositions. Conventional pigments include metallic oxides such as titanium dioxide, and iron oxide; metal hydroxides; metal flakes such as aluminum flake; chromates such as lead chromate; sulfides; sulfates; carbonates; carbon black; silica; talc; china clay; phthalocyanine blues and greens, organo reds; organo maroons and other organic pigments and dyes. Particularly preferred are pigments that are stable at high temperatures.

Pigments are generally formulated into a millbase by mixing the pigments with a dispersing resin which may be the same as or compatible with the material into which the pigment is to be incorporated. Pigment dispersions are formed by conventional means such as sand grinding, ball milling, attritor grinding or two-roll milling.

Other additives, while not generally needed or used, such as fiber glass and mineral fillers, anti-slip agents, plasticizers, nucleating agents, and the like, can be incorporated.

Method of Preparation

To obtain the morphology (and resultant properties) desired in the ionomer/polyamide blends of the present invention, it is necessary to obtain a blend of ionomer, particularly high-acid ethylene-acid copolymer which is highly neutralized, in a continuous (or co-continuous) polyamide phase even when the volume percent ionomer is greater than that of the polyamide. The present invention does this without the use of polymeric grafting agents containing certain reactive groups such as the ethylene/n-butyl acrylate/glycidyl methacrylate and ethylene/glycidyl methacrylate employed in U.S. Pat. No. 5,091,478 to Saltman.

The weight percent to volume percent correlation for the range of ethylene/methacrylic acid ionomer and nylon-6 employed in this invention, is about as indicated in the following table.

| Nylon-6 | | E/MAA Ionomer | |
|---|---|---|---|
| Wt. % | Vol % | Wt. % | Vol. % |
| 60 | 55.5 | 40 | 44.5 |
| 55 | 50.4 | 45 | 49.6 |
| 50 | 45.5 | 50 | 54.5 |
| 45 | 40.6 | 55 | 59.4 |
| 40 | 35.7 | 60 | 64.3 |

At the high degree of neutralization, the viscosity of the ionomer will exceed that of the polyamide at processing conditions. It has been found, however, that a process in which the ethylene-acid copolymer is first highly neutralized by methods known in the art and then is melt blended under intensive mixing conditions with the nylon is not preferred. Instead, a single step process or "in situ neutralization" process is preferred.

In this single step process, the ethylene-acid copolymers, preferably ones with high acid level, are neutralized to their ultimate level while the copolymers are being blended with the polyamide under intense mixing conditions. Non-neutralized (or lowly neutralized), high-acid ethylene-acid copolymer can be melt blended with the polyamide with all of its neutralization being effected during the melt blending.

The viscosity of the ethylene-acid copolymer at no or low neutralization will be lower than that of the nylon at processing temperature (about 250° to about 270° C. for nylon-6), and the nylon would be expected to disperse in the ethylene-acid copolymer. Desired dispersion of the ionomer in the nylon can be brought about by further neutralization while the ethylene-acid copolymers and the polyamides are being blended under intense mixing conditions. For example, Nylon-6 (ULTRAMID®B3 available from BASF) has the following viscosities under melt-blend conditions (different shear rates at 240° C. and at 260° C.). Data in the table is the viscosity of the polymer in pascal-seconds. As can be seen, the nylon viscosity exceeds that of the SURLYN®9120 ionomer (E/19 wt. % MAA 38% neutralized with zinc) available from E. I. du Pont de Nemours and Company in each case, but, upon further neutralization to 67–70%, the relationship switches.

| Shear Rate | SURLYN ®9120 about 38% Neut. | | E/MAA Ionomer about 67–70% Neut. | | Nylon-6 | |
|---|---|---|---|---|---|---|
| (seconds⁻¹) | 240° C. | 260° C. | 240° C. | 260° C. | 240° C. | 260° C. |
| 24 | 322 | 242 | 1141 | 541 | 489 | 370 |
| 206 | 212 | 145 | 684 | 311 | 389 | 289 |
| 401 | 160 | 109 | 516 | 265 | 336 | 248 |
| 596 | 142 | 99 | 436 | 231* | 291 | 223 |
| 997 | 110 | 80 | 362 | 200 | 245 | 193 |

*Viscosity of highly neutralized ionomer at a shear rate of 596 sec$^{-1}$ and a temperature of 260° C. is estimated based on other measured data.

Processing can be greatly simplified if the ethylene-acid copolymer is partially neutralized but to a level less than that ultimately desired prior to melt-blending with the nylon or, preferably, if ionomers such as the various SURLYN® ionomers, particularly ones with high acid levels, available from E. I. du Pont de Nemours and Company are employed as the starting ionomer which is further neutralized concurrently with or subsequent to blending with the polyamide to the desired percent neutralization. The starting ionomers can be made by processes well known in the art (see above).

It should be noted that ethylene-acid copolymers can attain a large range of viscosities through pseudo-crosslinks obtained by partial neutralization of the carboxylic acids. As the degree of neutralization increases, the viscosity increases eventually reaching a "no flow" state in a melt index (MI) test. The level of neutralization at which this occurs depends on factors well known to those skilled in the art of ionomers (e.g. the type of α,β-ethylenically-unsaturated $C_3$–$C_8$ carboxylic acid, the acid level, and the type of cationic counterion). Typically, for a low acid (about 10 wt. %) system, the maximum neutralization is about 70%, but for high-acid systems, "no flow" conditions will occur at lower percent neutralization.

It is important that, prior to blending with the polyamide, the percent neutralization should be low enough that the ethylene-acid copolymer/ionomer has not reached the "no flow" state. Preferably, however, the percent neutralization should be high enough that the viscosity of the ethylene-acid copolymer is closer to that of the nylon at the start of blending. Preferably, the viscosity should be within about 50 percent of the polyamide viscosity at blending temperature. By partially neutralizing preferably about 35 to about 40 percent of the acid, the viscosity of the ethylene-acid copolymer is raised closer to that of the nylon at the start of blending while not reaching the "no flow" state.

To achieve the desired morphology, the ethylene-acid copolymer, preferably partially neutralized with a cation that is compatible with the nylon, and the polyamide should be melt blended under intensive mixing conditions (high shear) with further neutralization as the blending occurs. Mixing should be at an intensity, temperature and residence time sufficient to get the desired morphology. An efficient devolitilization system is needed to remove water that is formed during the neutralization process. Devolitization efficiency is more important if starting at low or no neutralization since more water will be formed. Preferably there should be at least one vacuum zone in the melt compounding with at least 630 mm Hg vacuum applied to remove moisture.

The various starting ingredients may first be combined with one another in what is commonly referred to as a "salt and pepper" blend. They may also be combined by simultaneous or separate metering or they may be divided and blended in one or more passes into one or more mixing sections of mixing equipment such as extruders, Banbury mixers, Buss Kneaders, Ferrell continuous mixers or the like. If more than one feed zone is available, the nylon, the neutralizing agent preferably as a concentrate, and some of the ionomer may be added at the rear most feed port with the remainder of the ionomer being added in a later feed zone. The polymer strands exiting the extruder are preferably quenched in a water bath prior to cutting into pellets. Alternate methods well recognized by one skilled in the art for pelletizing including underwater cutting and air quenching can be used.

Preferred equipment for mixing is equipment such as employed in the examples, particularly a twin screw extruder optionally equipped with a static mixer such as sold by Kenics Company located between the extruder screws and the die. The extruder used in the examples preferably is run at a screw speed of 175 to 250 rpm. The sixteen sections of bushings comprise feed sections, kneading block mixing (reaction) sections, a vacuum extraction section with reverse pitch screws, and a die section.

Preferably, the mixing and the degree of neutralization should be sufficient to bring about the phase inversion (higher volume percent ionomer dispersed in the continuous or co-continuous nylon phase) in the mixing equipment. It should be recognized, however, that full inversion may not occur in the mixing equipment but may result from further working of the blend in injection molding operations for forming plaques and the like.

The differential scanning calorimeter (DSC) cooling exotherm can easily and quickly be determined and is a useful indicator of morphology and the sufficiency of mixing conditions for the desired morphology. The DSC cooling exotherm will differ depending on the nylon used, but can easily be determined by one skilled in the art. Preferably, the DSC cooling exotherm when using nylon 6 should be 160° C. to 180° C. when cooling is carried out at a rapid rate (e.g. 30 ° C./min.). The presence of this exotherm indicates that the desired phase relationship has been achieved.

Tensile tests are also useful indicators of the product morphology. When the morphology is correct, the ratio of Tension at Break ($T_B$) at room temperature (23° C.) to $T_B$ at elevated temperature (150° C.) preferably is less than about 12 to 15.

Molded Parts

Molded parts of the blend of the present invention made using standard injection molding techniques exhibit high gloss and improved mar resistance without the need of light graining. Without light graining, these molded parts exhibiting DOI's of at least 80 and as high as 90 to 95. Solid and metallic colors can be incorporated and parts can be painted. Since the blends allow for faster processing than resins used in prior-art fascia, the molded parts can be more readily made. The high temperature properties of the blend are sufficient to permit OEM Painting of molded parts without the need for special jigs or hangers to maintain part shape during the bake step.

The molded parts of blends of this invention with the addition of standard UV stabilizers for both ionomer and polyamide exhibit surprising weatherability, particularly stability when exposed to ultraviolet light for extended periods of time. These molded parts exhibit the low color shift, measured using, for example, the CIE 1976 (CIE LAB) color scale, needed for molded parts used in exterior applications. They exhibit AE color shift values of less than about 3 (a level considered as suitable for exterior automotive applications) when exposed to 2500 kilojoules/square meter in a Xenon-arc weatherometer (SAE J1960). Improved automobile fascia having DOI of at least 80 and superior mar resistance can be made from the blend of this invention.

EXAMPLES

Process

Except as otherwise indicated, mixing in each of the examples was in a five-heating-zone, 28 mm twin-screw extruder equipped with a Kenics Company static mixer between the tip of the extruder and a single hole die plate. The extruder in each case was operated at a screw speed of 200 revolutions per minute (rpm) with the vacuum port run at about 630 mm mercury vacuum with ingredients fed at a rate of about 10 pounds per hour to the rear feed zone of the extruder. A nitrogen blanket was maintained on the feed hopper. The temperature profile across the length of the extruder was: Throat, about 25° C.; Zone 1, 220° C.; Zones 2, 3, 4, and 5, 250° C.; Adapters 1 and 2, 250° C.; and Die, 265° C. Residence time for the samples was about 2.5 minutes. Samples were quenched in a water bath (about 23° C.) prior to cutting into pellets.

Except as otherwise indicated, the samples in each case were injection molded on a 6 ounce capacity injection molding machine using a general purpose screw with barrel temperature set to achieve melt temperatures in the 260° C. range. Molding conditions employed were fast ram forward speed, 60 rpm screw speed, 50 pounds per square inch gauge (psig) back pressure, 400–800 psig injection pressure, 20 second (sec.) injection time, 30 sec. hold time, and 5/32 inch nozzle.

Standard additive/stabilizer packages were used in each case. The preferred packages include stabilizers for both nylon and ionomer. The package, for example, may include various components as discussed above including, for example, IRGANOX®, TINUVIN®, and CHIMMASORB® stabilizers.

The neutralizing agent concentrates used in these examples are blends of the principle neutralizing agent (e.g. zinc oxide in the ZnO Concentrate and magnesium hydroxide in the MgO Concentrate) in an ethylene/low (5 to 10) wt. % methacrylic acid copolymer carrier made under conditions that assure insignificant neutralization of the carrier. The Concentrate may also contain low levels (up to 2 wt. %) metal salts such as acetates and stearates. The "percent" indicated with respect to the concentrate is the weight percent (based on total weight of concentrate) of the principle neutralizing agent in the concentrate. That is, the 50% MgO Concentrate used in the examples contains 50 wt. % (based on total weight of concentrate) magnesium oxide in an ethylene/5 wt. % methacrylic acid copolymer. The 30% ZnO Concentrate contains 30 wt. % (based on total weight of concentrate) zinc oxide in an ethylene/5 wt. % methacrylic acid copolymer and the 45% ZnO Concentrate contains 45 wt. % (based on total weight of concentrate) zinc oxide in an ethylene/10 wt. % methacrylic acid copolymer.

Unless otherwise indicated, the nylon 6 used in the examples was CAPRON®8202 nylon 6 available from Allied Signal.

Tests

Tests on the injection molded test specimens (disks or plaques, as the case might be) reported in the examples were Tensile at Break (ASTM D1708) and Elongation at Break (ASTM D1708) at 23° C. and 150° C., and flexural modulus (ASTM D790A) at 23° C.

The specimen morphologies were also examined with Transmission Electron Microscopy (TEM). Very thin section samples of the specimens were microtomed at cryogenic temperatures in both the machine direction (parallel to flow) and the transverse direction (perpendicular to flow). The samples were stained with phosphotungstic acid which attaches to the nylon component and increases contrast of the transmission picture (ionomer appears lighter and the nylon darker in the high magnification photographs).

Gloss was measured using a Novo-Gloss Meter at 60° angle (black standard=93.64).

Example 1

49.8 wt. % nylon-6, 48.6 wt. % SURLYN®9220 (E/20 wt. % MAA about 34% neutralized with zinc) further neutralized to about 75% with zinc and 1.6 wt. % Additive and Stabilizer Package were fed to the extruder.

Example 2

4 wt. % of 45% ZnO Concentrate was added to the extruder feed to further neutralize the ionomer (4 wt. % of the ionomer was removed to account for the 45% ZnO Concentrate, all else being as in Example 1.

Example 3

Example 1 was run with the following changes: (a) the SURLYN®9220 was neutralized to about 67% with zinc, (b) the screw speed on the extruder was reduced to 150 rpm, and (c). the Kenics static mixer was not used.

TABLE I

|  | Ex. 1 | Ex. 2 | Ex. 3 |
|---|---|---|---|
| Tensile at Break 23° C. | 6995 psi | 6950 psi | 6940 psi |
| Elongation 23° C. | 205% | 155% | 235% |
| Tensile at Break 150° C. | 2390 psi | 2350 psi | 545 psi |
| Elongation 150° C. | 305% | 310% | 175% |
| Ratio of $\frac{\text{Tensile at Break 23° C.}}{\text{Tensile at Break 150° C.}}$ | | | |
| Flexural Modulus | 203.6 Kpsi | 176.7 Kpsi | |

In Examples 1 and 2, the ionomer is seen as dispersed throughout the continuous nylon phase, mostly as spherical particles in the 0.1 to 0.2 μm range (see FIG. 1). In Example 3, the ionomer appears spherical in the sample cut perpendicular to flow, but are highly distorted in the sample cut parallel to flow (see FIG. 2). The ionomer and nylon appear to be co-continuous in Example 3.

Example 4—Comparison to BEXLOY®W

The SURLYN® ionomer/nylon blend in Table II is a blend of 55 wt. % nylon blend, 43.4 wt. % E/19 wt. % MAA neutralized with zinc to 68%, and 1.6 wt. % stabilizer package. The BEXLOY®W 501 is a commercially available blend of polyolefin and ionomer without glass filler.

TABLE II

|  | BEXLOY®W 501 | SURLYN® IONOMER/NYLON |
|---|---|---|
| Viscat Soft Temperature | 105° C. | 200° C. |
| Tabor Abrasion, CS-17 Wheel 500 gm/wt, 5000 cycles | 0.028 (0.12% loss) | 0.018 (0.07% loss) |
| Flexural Modulus | 115 Kpsi | 220 Kpsi |
| 150° C. Tensile | (above melting point) | 2300 psi |
| Gloss, 600 Angle | 80.3–84.7 | 88.6–90.5 |
| Molding Cycle Time | about 40 sec. | about 20 sec. |

Examples 5–25

Various series of experiments were run. Because of differences in mold surface quality and molding machine operation, it is safest to compare values within a series. In each example, a test disk or plaque was molded and tested for gloss and mechanical properties. Average results of five gloss readings are set forth in Table III. Mechanical properties measured are set forth in Table IV (no measurements were made in cases where no data is present).

First Series

Example 5

55 wt. % nylon-6; 37 wt. % ionomer (E/20% MAA initially about 40% neutralized with $Mg^{+2}$) and 1.3 wt. % stabilizer package were intensively blended and further neutralized during blending (in-situ) with 6.7 wt. % of 50% MgO Concentrate to about 90%. The resulting disk had a very low gloss value. Melt fracture was clearly evident during extrusion. Properties were poor.

Example 6

In a first step, SURLYN® 9220 was first further neutralized with 30% ZnO Concentrate to about 72%. In a second step, 40 wt. % of the resulting ionomer; 55 wt. % nylon-6; and, 1.3 wt. % stabilizer package were intensively blended and neutralized in-situ to about 100% with 3.7 wt. % of 30% ZnO Concentrate.

Example 7

40.0 wt. % of the ionomer made in the first step of Example 6; 50 wt. % nylon-6; 5 wt. % SELAR® PA (6 isophthalic/6 terephthalic) amorphous nylon; 3.7 wt. % 30% ZnO Concentrate; and 1.3 wt. % stabilizer package were intensively blended.

Example 8

35.0 wt. % of the ionomer made in the first step of Example 6; 55 wt. % nylon-6; 5 wt. % SELAR®PA; 3.7 wt. % 30% ZnO Concentrate; and 1.3 wt. % stabilizer package were intensively blended.

Example 9

In a single step process, 55 wt. % nylon-6; 37 wt. % E/20% MAA neutralized with $Mg^{+2}$ to about 40%; and 1.3 wt. % stabilizer package were intensively blended and further neutralized during blending with 6.7 wt. % of 30% ZnO Concentrate to about 100% neutralization.

Example 10

In a single step process, 37.2 wt. % SURLYN® 9220 was intensively blended with 54 wt. % nylon-6; and, 1.3 wt. % stabilizer package and neutralized in-situ to about 100% with 7.5 wt. % of 30% ZnO Concentrate to about 95% neutralization.

Second Series

Comparative Example 11

61.95 wt. % ALATHON® 6580 polyethylene, 1.25 wt. % stabilizer package, and 32.4 wt. % SURLYN® 9120 (E/19 wt. % MAA 38% neutralized with zinc) were fed to the extruder and, while mixing, further neutralized with 4.4 wt. % of 30% ZnO Concentrate to 76% neutralization. High Gloss did not result even with high-acid ionomer and high degree of neutralization.

Comparative Example 12

45 wt. % ALATHON® 7030 polyethylene, 51.2% SURLYN® 9120, and 0.8 wt. % stabilizer package were fed to the extruder and, while mixing, further neutralized with 3.0 wt. % of 30% ZnO Concentrate to 57% neutralization. High Gloss did not result even with high-acid ionomer and a moderate degree of neutralization.

Example 13

46 wt. % nylon-6, 43.6 wt. % SURLYN® 9120, and 1.8 wt. % stabilizer package were fed to the extruder and, while mixing, further neutralized with 8.6 wt. % of 30% ZnO Concentrate to about 97% neutralization.

Example 14

43 wt. % nylon-6, 46.05 wt. % SURLYN® 9120, and 1.8 wt. % stabilizer package were fed to the extruder and, while mixing, further neutralized with 8.6 wt. % of 30% ZnO Concentrate and 0.55 wt. % CaO powder to about 100% neutralization.

Example 15

40% nylon-6, 48.95 wt. % SURLYN® 9120, and 1.8 wt. % stabilizer package were intensively blended and extruded and, while mixing, were further neutralized with 8.7 wt. % of 30% ZnO Concentrate and 0.55 wt. % CaO powder to about 100% neutralization.

Example 16

46 wt. % nylon-6, 49.6% SURLYN® 9520 (E/10 wt. % MAA neutralized with zinc to 72% neutralization), and 1.8 wt. % stabilizer package were intensively blended, and, while mixing, further neutralized with 2.6 wt. % of 30% ZnO Concentrate to about 100% neutralization.

Third Series

Example 17

45 wt. % nylon 6; 50.7 wt. % SURLYN® 9320 (E/24 wt. % nBA//~10 wt. % MAA; 67% zinc neutralized); and 1.8 wt. % stabilizer package were intensively blended and, while mixing, further neutralized with 2.5 wt. % of 30% ZnO Concentrate to about 95% neutralization.

Example 18

45 wt. % nylon 6, 25.4 wt. % SURLYN® 9320 plus 25.3% SURLYN® 9520, and 1.8 wt. % stabilizer package were, while being intensely mixed, further neutralized with 2.5 wt. % of 30% ZnO Concentrate to about 95% neutralization.

Example 19

45 wt. % nylon 6, 25.2 wt. % SURLYN® 9320 plus 25.3% SURLYN® 9520, and 1.8 wt. % stabilizer package were, while being intensely mixed, further neutralized with 2.5 wt. % of 30% ZnO Concentrate and 0.2 wt. % CaO powder to about 100% neutralization.

Example 20

45 wt. % nylon 6 and 50.7 wt. % SURLYN® 9020 (E/10 wt. % iBA/10 wt. % MAA, 73% neutralized) and 1.8 wt. % stabilizer package were, while being intensely mixed, further neutralized with 2.5 wt. % of 30% ZnO Concentrate to about 95% neutralization.

Example 21

45 wt. % nylon 6, 25.2 wt. % SURLYN® 9520 and 22.3 wt. % high acid SURLYN® 9120 and 1.8 wt. % stabilizer package were, while being intensely mixed, further neutralized with 5.7 wt. % of 30% ZnO Concentrate to about 97% neutralization.

Example 22

45 wt. % nylon 6, 25.2 wt. % SURLYN® 9320 and 22.3 wt. % SURLYN® 9120 and 1.8 wt. % stabilizer package were, while being intensely mixed, further neutralized with 5.7 wt. % of 30% ZnO Concentrate to about 97% neutralization.

Example 23

45 wt. % nylon 6, and 44.2 wt. % SURLYN® 9120, 1.8 wt. % stabilizer package, and 0.5% zinc stearate were, while being intensely mixed, further neutralized with 8.5 wt. % of 30% ZnO Concentrate to about 93% neutralization.

Forth Series

Example 24

44 wt. % ULTRAMID® nylon 6, 45.7wt. % SURLYN® 9120, and 1.9 wt. % stabilizer package plus 1.0 wt. % zinc stearate processing aid were, while being intensely mixed, further neutralized with 7.4 wt. % of 30% ZnO Concentrate to about 88% neutralization and extruded at the rates given below on a 40 mm diameter twin screw extruder. Samples were molded into one eighth inch thick disks using the molding conditions described above and the mold temperatures given below.

24A Extrusion rate of 125 pounds per hour (lbs/hr). Mold temperature of 60° C.
24B Extrusion rate of 125 lbs/hr. Mold temperature of 25° C.
24C Extrusion rate of 150 lbs/hr. Mold temperature of 25° C.

Example 25

44 wt. % ULTRAMID® nylon 6, 46.9wt. % SURLYN® 9120, and 1.9 wt. % stabilizer package plus 1.0 wt. % zinc stearate processing aid, were, while being intensely mixed, further neutralized with 6.2 wt. % of 30% ZnO Concentrate to about 80% neutralization and extruded at rates given below. Following vacuum oven drying for at least 8 hours at 80° C, samples were molded into one eighth inch thick disks using molding conditions described above and mold temperatures given below.

25A Extrusion rate of 124 lbs/hr. Mold temperature of 60° C.

25B Extrusion rate of 100 lbs/hr. Mold temperature of 60° C.
25C Extrusion rate of 100 lbs/hr. Mold temperature of 25° C.

TABLE III (Gloss Readings)

| Example | Average (5 readings) | Standard Deviation | Part Color | Part Type |
|---|---|---|---|---|
| 5 | 35.4 | 4.4 | BLACK | DISK |
| 6 | 91.8 | 1.1 | BLACK | DISK |
| 7 | 92.6 | 0.6 | BLACK | DISK |
| 8 | 90.9 | 0.7 | BLACK | DISK |
| 9 | 92.5 | 0.9 | BLACK | DISK |
| 10 | 91.8 | 0.5 | BLACK | DISK |
| 11 | 19.5 | 5.2 | BLACK | PLAQUE |
| 12 | 46.6 | 2.5 | BLACK | PLAQUE |
| 13 | 84.4 | 5.0 | BLACK | PLAQUE |
| 14 | 87.7 | 4.1 | BLUE | DISK |
| 15 | 84.3 | 1.9 | BLUE | DISK |
| 16 | 76.5 | 8.6 | BLUE | DISK |
| 17 | 78.3 | 1.8 | BLUE | DISK |
| 18 | 81.8 | 12.9 | BLUE | DISK |
| 19 | 65.3 | 10.4 | BLUE | DISK |
| 20 | 76.5 | 6.5 | BLUE | DISK |
| 21 | 89.3 | 1.9 | BLUE | DISK |
| 22 | 87.8 | 7.Z | BLUE | DISK |
| 23 | 91.5 | 1.1 | BLUE | DISK |
| 24A | 90.9 | 1.1 | BLUE | DISK |
| 24B | 90.7 | 0.6 | BLUE | DISK |
| 24C | 89.4 | 1.8 | BLUE | DISK |
| 25A | 92.4 | 0.6 | BLUE | DISK |
| 25B | 91.7 | 1.3 | BLUE | DISK |
| 25C | 92.5 | 0.5 | BLUE | DISK |

TABLE IV (Mechanical Properties)

| Ex. | Viscat Softening Temperature (°C.) | Tensile at Break $T_B$ (psi) @23° C. | Tensile at Break $T_B$ (psi) @150° C. | Ratio of $T_B$ @ 23° C. to $T_B$ @ 150° C. | Elongation $E_B$ (%) @23° C. | Elongation $E_B$ (%) @150° C. |
|---|---|---|---|---|---|---|
| 5 | 189.8 | 4985 | 230 | 21.67 | 10 | 55 |
| 6 | 204.5 | 7145 | 2580 | 2.74 | 140 | 325 |
| 7 | 200.7 | 7165 | 2615 | 2.77 | 200 | 380 |
| 8 | 203.9 | 7075 | 2730 | 2.59 | 130 | 345 |
| 9 | 203.7 | 6500* | 2485 | 2.62 | 25** | 300 |
| 10 | 204.1 | 6695* | 2395 | 2.80 | 25** | 305 |
| 11 |  | 3695 | 430*** | 8.59 | 305 | 580*** |
| 12 |  | 3805 | 420*** | 9.06 | 250 | 585*** |
| 13 |  | 6435 | 1500 | 4.29 | 170 | 300 |
| 14 |  | 6125 | 515 | 11.89 | 155 | 306 |
| 15 |  | 5575 | 110 | 50.68 | 145 | 145 |
| 16 |  | 5485 | 1050 | 5.22 | 220 | 235 |
| 17 |  | 4150 | 115 | 36.09 | 210 | 165 |
| 18 |  | 4685 | 130 | 36.04 | 200 | 170 |
| 19 |  | 5630 | 905 | 6.22 | 225 | 240 |
| 20 |  | 5430 | 940 | 5.78 | 220 | 240 |
| 21 |  | 5330 | 55 | 96.91 | 180 | 255 |
| 22 |  | 5415 | 420 | 12.89 | 185 | 210 |
| 23 |  | 6375 | 975 | 6.54 | 165 | 275 |
| 24A | 161.0 | 6850 | 1545 | 4.43 | 205 | 310 |
| 24B |  | 6530 | 1300 | 5.02 | 205 | 320 |
| 24C |  | 6610 | 1590 | 4.16 | 195 | 330 |
| 25A | 156.0 | 6315 | 1300 | 4.86 | 195 | 310 |
| 25B |  | 5990 | 1305 | 4.59 | 180 | 305 |
| 25C |  | 6800 | 1345 | 5.06 | 225 | 310 |

*$T_{MAX}$
**$E_{MAX}$ (Elongation at maximum Tensile)
***Tests run at 95° C.

We claim:

1. An ionomer/polyamide blend of one or more polyamides, the polyamides forming a continuous or co-continuous phase, with one or more ionomers dispersed therein, the ionomer(s) being present in the range of 60 to 40 weight percent and the polyamide(s) being present in the range of 60 to 40 weight percent based on total weight of ionomer and polyamide, the ionomer(s) being direct copolymer(s) comprising ethylene and α,β-ethylenically-unsaturated $C_3$–$C_8$ carboxylic acid wherein the average acid of the direct copolymer(s) prior to neutralization is present in a high percentage and wherein sufficient acid in the range of 65 to 100 mole percent of the acid is neutralized with one or more metal cations to increase the viscosity of the ionomer(s) above that of the polyamide(s) at melt temperature.

2. The ionomer/polyamide blend of claim 1 wherein the α,β-ethylenically-unsaturated $C_3$–$C_8$ carboxylic acid is methacrylic acid making up 15 to 25 weight percent of the direct copolymer of ethylene and methacrylic acid.

3. The ionomer/polyamide blend of claim 1 wherein the α,β-ethylenically-unsaturated $C_3$–$C_8$ carboxylic acid is acrylic acid making up 14 to 25 weight percent of the direct copolymer of ethylene and acrylic acid.

4. The ionomer/polyamide blend of claim 1 wherein one or more of the direct copolymers further comprises a softening monomer selected from alkyl acrylate and alkyl methacrylate.

5. The ionomer/polyamide blend of claim 4 wherein the direct copolymers are present as a blend of one or more dipolymers wherein the acid prior to neutralization in the dipolymer is present in a high percentage and one or more E/X/Y copolymers where E is ethylene, X is softening monomer selected from alkyl acrylate and alkyl methacrylate, and Y is an α,β-ethylenically-unsaturated $C_3$–$C_8$ carboxylic acid, the acid level of the blend prior to neutralization being high.

6. The ionomer/polyamide blend of claims 1, 2, 3, 4 or 5 wherein the metal cation also interacts with the amide links of the polyamide.

7. The ionomer/polyamide blend of claim 6 wherein the cation is zinc.

8. The ionomer/polyamide blend of claim 1 wherein the ionomer is dispersed as mostly spherical particles having an average diameter of about 0.1 to about 0.2 μm or as ellipsoid particles having a minor axis length of about 0.1 to about 0.2 μm.

9. The ionomer/polyamide blend of claim 1 wherein the ellipsoid particles have a ratio of major axis length to minor axis length of greater than about 10 to 1.

10. The ionomer/polyamide blend of claim 1, the polyamides comprise semicrystalline polyamides.

11. The ionomer/polyamide blend of claim 10 wherein the polyamide comprises polyepsiloncaprolactam (nylon-6).

12. The ionomer/polyamide blend of claim 10 wherein the polyamides comprise a blend of semicrystalline polyamides and up to about 10 wt. % amorphous polyamide based on total polyamide weight.

13. The ionomer/polyamide blend of claim 12 wherein the amorphous polyamide is hexamethylenediamine isophthalamide/terephthalamide terpolymer.

14. The ionomer/polyamide blend of claim 1 further comprising one or more UV stabilizers for the ionomer and the polyamide.

15. An article molded from the ionomer/polyamide blend of claim 1.

16. The article of claim 15 wherein the ionomer/polyamide blend from which it is molded further comprises one or more UV stabilizers for the ionomer and the polyamide.

17. The article of claim 16 in the form of automobile fascia.

18. The article of claim 17 wherein the automobile fascia is a bumper having a DOI of at least 80.

19. A process for making a blend of about 60 to about 40 wt. % of one or more ionomers in a continuous or co-continuous phase of about 40 to about 60 wt. % of one or more polyamides comprising melt blending under intense mixing conditions components consisting essentially of one or more ethylene/α,β-ethylenically-unsaturated $C_3$–$C_8$ carboxylic acid direct copolymers having a high α,β-ethylenically-unsaturated $C_3$–$C_8$ carboxylic acid level and one or more polyamides and, while mixing, neutralizing the acid with one or more metal cations sufficiently to raise the viscosity of the ionomer that results from neutralizing the direct copolymer to level greater than that of the polyamide at melt temperatures.

20. The process of claim 19 wherein the ionomer is present in a higher volume percent than the polyamide.

21. The process of claim 19 wherein the cation also interacts with the amide links of the polyamide.

22. The process of claim 21 wherein the cation is zinc.

23. The process of claim 19, the one or more direct copolymers being partially neutralized prior to melt blending with the polyamide.

24. The process of claim 23 wherein the degree of neutralization prior to melt blending is about 35 to about 40 percent.

25. The process of claim 19 wherein the acid in the direct copolymer is methacrylic acid present in a range of 15 to 25 wt. % of the copolymer or is acrylic acid present in a range of 14 to 25 wt. % of the copolymer.

26. The process of claim 25 wherein the neutralization while mixing is to a percent neutralization of at least 65%.

* * * * *